June 18, 1935. A. V. DE FOREST Re. 19,611

MAGNETIC TESTING METHOD AND MEANS

Original Filed July 5, 1929

INVENTOR.
A. V. de FOREST
BY Frederick S. Duncan
ATTORNEYS.

Reissued June 18, 1935 Re. 19,611

UNITED STATES PATENT OFFICE 19,611

MAGNETIC TESTING METHOD AND MEANS

Alfred V. de Forest, Cambridge, Mass., assignor, by mesne assignments, to Magnaflux Corporation, a corporation of Pennsylvania Original No. 1,960,898, dated May 29, 1934, Serial No. 375,984, July 5, 1929. Application for reissue March 23, 1935, Serial No. 12,714

14 Claims. (Cl. 175—183)

This invention particularly relates to a method of and means for locating and evaluating cracks, flaws, discontinuities, or the presence of inhomogeneities of any knd, in, on, or near the surface regions of iron or steel bodies. Such imperfections may or may not be vital to the satisfactory employment of such bodies and it is an important element of my invention that means are provided for readily determining the abruptness of any change in continuity or state of the body, as well as the extent of the imperfection, since both of these characteristics determine its suitability for use.

If a body of magnetizable material is subjected to the action of a magnetizing force, lines of magnetic flux are set up in such a body. The path taken by such lines of flux are in large part determined by both the degree of continuity and the homogeneity of the body and it is an object of my invention to provide a highly sensitive and simple means for detecting both the existence and the degree of deviation of flux from the theoretical path.

In carrying out my invention, I preferably subject the body to be examined to the action of a magnetizing field and bring into contact with such body finely divided particles of magnetizable material. Such particles are attracted by and cling to the surface of the body at regions of the latter where discontinuities or other defects exist, by reason of the magnetic polar effects exhibited by the body with their consequent leakage lines of flux.

I am aware that for many years a method broadly similar to the above has been used for detecting such defects as cracks, seams or inclusions, particularly in the examination of permanent magnets, where such cracks may exist as the result of a hardening process, and that a method allied thereto has been employed for the determination of like defects in tools and other bodies of manufacture. In such use, the fine magnetizable particles may be brought into contact with the body under test, as by sprinkling thereon. In another method of application of the process the particles are held in suspension in a liquid medium, such as oil, and the magnetized body is immersed therein. The fluid medium tends to render the fine particles highly mobile and therefore the more free to orient themselves for ready grouping in the vicinity of leakage lines of flux from the material. My invention however, provides a distinct departure from the former procedure in this field of testing in that it includes methods of selecting, preparing and applying the fine particles of magnetizable material so as to avoid many of the difficulties, uncertainties and complications which surround the proper determination of a defect and the degree of hazard associated therewith in the use of the body having such defect.

Other objects of my invention will appear as the specification of my invention proceeds.

Figure 1:
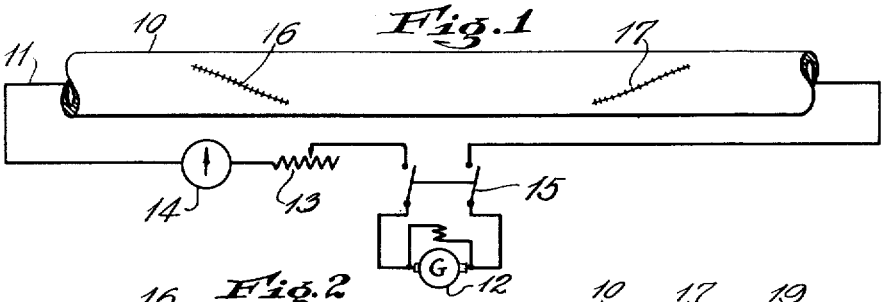
Fig. 1 is a side elevation of a steel tube which is magnetized by means of a central conductor, and showing finely divided particles of magnetizable material attracted to the surface thereto in regions where imperforations exist.

Serious flaws in a bar may be invisible to the unaided eye, but even when of major size and readily visible it is often difficult to determine their seriousness from the standpoint of their effect on the usefulness of the material. If, however, the test body is subjected to the action of a magnetizing force or field and magnetizable material in a more or less finely divided condition is brought into contact with its surfaces, the particles thereof will tend to adhere to the surface of the bar at the regions where the flaws exist. This, for the reason that any discontinuity or change in homogeneity results in the setting up of local magnetic polar effects, with attraction of the particles.

I have found, however, that to obtain the full benefit of such a test method for "spotting" flaws there are two major points with reference to the particles themselves which require careful consideration. One has to do with both the size and the shape, as also with the magnetic quality of the particles, and the other with the proper coating of such particles in order to obtain in the fullest practicable measure, by preventing undue magnetic interaction, the advantages of the intrinsic characteristics which they possess as units.

With regard to the first point, the selection of size, shape and quality is intimately connected with the determination of the extent of the flaw which is to be indicated by the lodgment of such particles in its vicinity. The smaller the flaw, the less tendency there is for the particles to adhere and therefore the proper choice of size, shape and quality permits of discrimination between flaws which may be of such superficial character as to be wholly removable under an ordinary surface finishing process and others which by their depth and extent warrant immediate discarding of the material under test. For this reason I frequently find it practicable to apply in an individual test, particles which vary one from the other in size, shape and quality in order to more completely bring out the extent and character of the flaw. As for the second point, while it is often desirable that the particles used for spotting imperfections be in a fine state of subdivision, as this increases their sensitivity as a detecting means, if this subdivision is carried too far there is a tendency for the particles to pack or cluster about faulty regions in mass formation which is often without relation to the extent or character of the flaw. The full advantage of the test method is not obtained unless the grouping of the particles carries significance. For the purpose of incorporating such an advantage, I have successfully experimented with ways and means of initially so preparing the particles that the tendency to mass or pack is largely avoided, with the result that the amount of subdivided material attracted by a flaw is substantially that held by the direct polar effect of the flaw itself and the grouping or pattern thereof has a definite relation to the type and extent of such flaw.

More specifically to explain my invention, in Fig. 1 I show a magnetizable body 10, such as a length of hot rolled seamless steel tubing, which has been heat treated as a final step in manufacture. Such heat treatment may result in the development of fine cracks which are highly deleterious to its use. There may at the same time also exist in the body, as a result of the rolling process, surface seams or checks which are of minor importance. It is therefore highly necessary to adequately differentiate between such irregularities. If a method of inspection involving the use of magnetization and the attraction of fine particles of magnetizable matter is to be employed the attracted material should by its amount and grouping provide a direct basis of judgment as to the importance of the flaw thus indicated.

In the application of my invention I may first magnetize the body 10, by means of direct current in a conductor 11 which passes interiorly of the tube in the direction of its length and is connected to a source of electromotive force 12, as for example a direct-current generator, through a rheostat 13, ammeter 14 and switch 15. Under the action of the current in conductor 11, a magnetic flux is developed in the body 10 which has a direction at right angles to its axis. When the current in the conductor 11 is reduced to zero, a portion of the total flux which has thus been developed persists. That is, the tube is still in magnetized state. Then the whole surface portion of the tube is brought into contact with finely divided particles of iron or other magnetizable material, whereupon such particles are attracted by and group themselves about any discontinuity or imperfection on or near the surface of the tube, as shown at 16 and 17.

As indicated above, the particles thus to be attracted are preferably of material which is highly magnetic, for example of more or less pure iron or an alloy of iron of high permeability. These particles are coated with a substance which prevents metal to metal contact between such particles and acts as a lubricant or provides a highly smooth surface so as to reduce the coefficient of friction. In addition the particles may be pigmented so as to render them the more highly visible. It is obvious that the finely divided particles may be brought into contact with the body under test in various ways. For example, I may mount the body 10 upon a mandrel and revolve it about a series of nozzles through which the finely divided particles are caused to coact with the tube surface by means of air pressure. I may also rotate the body 10 while causing it to pass longitudinally through a rotating chamber in which the fine particles are given such a motion as to cause them to come into contact with the tube surfaces.

The process of treating the particles, so as to allow of a high degree of fineness without the disadvantages ordinarily accruing thereto, consists in coating them with such a substance as will to a considerable degree prevent magnetic contact of the particles with one another, and one which at the same time acts as a lubricant as explained above. For this purpose I, at times, prefer to employ a non-hygroscopic compound such as zinc oxide, although it will be understood that other forms of coating, such as graphite or aluminum powder, or the use of the coating processes known as calorizing or sherardizing may be employed without departing from the spirit of my invention. After selecting particles of a size and quality suitable to the work in hand I treat them with gasoline or other light oil permitting the oil to vaporize and leave a thin oil film on each particle. Then I bring the particles into intimate contact with an equal volume of zinc oxide, as by agitating both in a container, so that each particle is coated with the oxide, the oil films acting to retain such coating.

The coating of oxide prevents direct metal to metal contact of the particles, one with the other. Such contact, if freely permitted, would allow the particles to align themselves under magnetizing influences which are secondary to the direct polar effect of the flaw itself; that is, their grouping would be unduly affected by their own interaction and result in packing or clotting to an undesirable degree. In addition to the above advantage, the coating provides a lubricated surfacing to each particle which reduces friction and renders the particles more mobile than would otherwise obtain. So important is it that the tendency to pack be overcome that at times I subject the body under test to mechanical vibration or jarring in order to further promote significant grouping. In addition to the other advantages outlined, the coating of oxide presents a dead white finish and renders the particles highly visible against the darker background of the body under test, thereby marking more distinctly the region of the flaw.

Important advantages of my invention therefore lie in the provision of a detecting material made up of particles of a size and form determined by the magnitude of the flaws which it is proposed to detect, and one which is so prepared that such particles are and to a considerable extent remain magnetically integral even under the influence of a high degree of magnetization and yet are highly mobile without the necessity of employing a liquid medium. Such liquid mediums often present practical difficulties due to the necessity that later ensues of cleaning the test body. An important additional advantage of the invention is that the particles tend to demagnetize themselves readily when once removed from the magnetizinz field, through the absence of direct contact with each other, and hence may be used over and over without loss of efficiency in the detection of flaws. It may also be pointed out that the effective sensitivity of the particles is greatly increased by reason of the lubricating feature of the coating selected, in that such particles may the more freely align themselves without actual contact with the flaw or imperfection. This is of considerable advantage where it is desired to locate flaws in material where the body surface is covered with scale, as in the case of billets or ingots. Hitherto, it has been found advisable to first remove such scale by means of a pickling or sand blast process.

Figure 2:
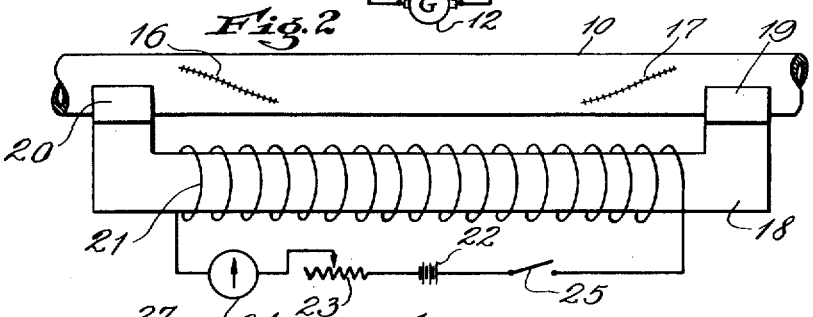
Fig. 2 is a view in side elevation of the tubular body in which the magnetization is effected by means of a yoke energized through a magnetizing winding.

While I may, as in connection with the test body of Fig. 2, so magnetize this body that the path of the flux is in a direction at right angles to its axis, I do not necessarily limit myself to such forms of magnetization. In Fig. 2 I show a magnetizing arrangement wherein the body 10 is subjected to magnetizing means including a yoke 18, having circularly arcuate contact poles 19 and 20 across which the body 10 is bridged. On the yoke 18 is a magnetizing winding 21 which is energized by means of current from a suitable source of electromotive force, such as a battery 22, through rheostat 23, ammeter 24 and switch 25. Upon passage of current through the winding 21, the body 10 becomes magnetized in such manner that the flux developed has a direction corresponding to the direction of length of such body and the attractable material used for the purposes of flaw detection may be brought into contact with the body while such current is flowing or immediately following its application, that is, while the body is in a state corresponding to residual magnetization.

Figure 3:
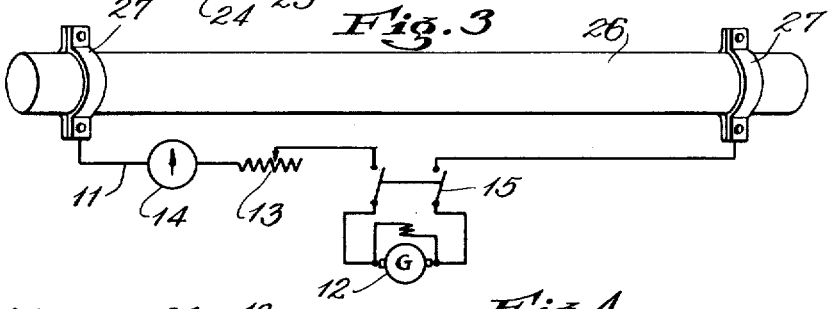
Fig. 3 is a view in side elevation of a steel bar of circular section in which the magnetization is effected by means of an electric current traversing the bar in the direction of its length.

In Fig. 3 I show a further application of my invention, similar to that shown in Fig. 1, wherein a round bar of magnetizable material 26 is traversed by an electric current in the direction of its length. Current is caused to pass through the bar 26 by way of conducting clamps 27 attached near its end regions. Allowing for a slight distortion of the direction of current flow in the immediate vicinity of the clamps 27 arising from possible lack of uniform contact of such clamps with the bar 26, it will be clear that the path of current flow in a homogeneous bar will be parallel to the axis of such bar at all points. Under such conditions the bar becomes circularly magnetized, that is, each element of longitudinal current produces magnetic flux in the bar which has a direction normal to the direction of current flow. In a homogeneous bar there will be little or no external evidence of magnetization and any magnetizable material brought into contact with the surface of the bar will evidence no attraction. The presence of a flaw or other imperfection, however, will distort the direction of current flow, with corresponding change in the direction of flow of the induced lines of force. Magnetic polar effects will result at such flaw regions with attraction of magnetizable particles brought into contact with the body.

Reference has been made to the use of pigments for coloration purposes in connection with the subdivided attractable material, for the purpose of increasing visibility under inspection. Where a proper degree of contrast between the particles and the body under test is thus provided, a permanent record is possible through the medium of photography. It is also practicable, particularly in the inspection of uniform lengths of material having highly important applications, to employ electrically recording means for the purpose of obtaining a complete record of the inspection and in Fig. 4 I show a method of such recording which has certain advantages.

Figure 4:
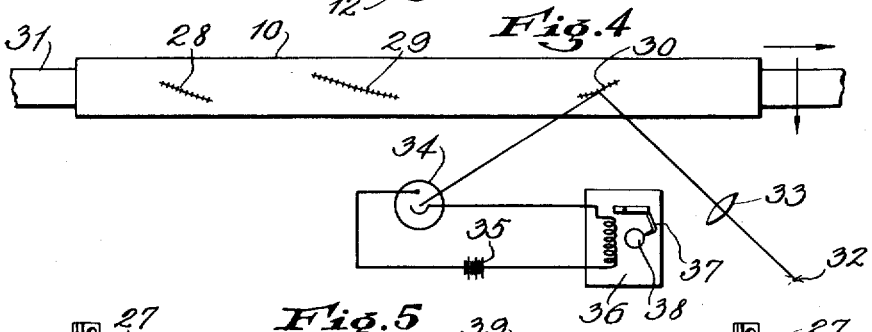
Fig. 4 is a view in side elevation of a steel tube, with means for recording the presence of flaws in the tube through the variation in amount of light reflected from its surface resulting from the presence of particles of attracted material.

Fig. 4 represents a steel tube 10 like that of Figs. 1 and 2, which has been subjected to the action of a magnetizing field and has had attracted thereto, by reason of imperfections in its structure, patches or groups of finely divided material 28, 29 and 30. The tube 10 is mounted upon and affixed to a mandrel 31. The latter is capable of combined rotation and longitudinal motion, in the directions as indicated by the arrows, which is effected by suitable gearing, not shown. A light source 32, with lens 33, is provided so that a beam of light rays impinges upon the surface of the tube 10 and thence is reflected to a photoelectric cell 34. As will be apparent, upon the rotation and translation of the mandrel 31 with the tube 10, the beam of rays coacts successively with every element of surface of the tube 10. The amount of light which therefore reaches cell 34 is affected in accordance with the presence and amount of attracted material represented by the groups 28, 29 and 30. Connected to the electrodes of cell 34 is a source of electromotive force 35 in series with which is connected an electromagnetic recording mechanism 36. The latter has an inked stylus 37 coacting with a chart 38, which latter is given movement of rotation and translation corresponding to that of mandrel 31, through suitable clock mechanism. When the light rays reflected from the surface of the tube 10 impinge upon the cell 34, there is a current change in the circuit embracing the recorder 36 in proportion to the amount of light received by such cell. Since this amount of light is dependent upon the reflecting properties of the surface of the tube 10, the presence of the patches or groups of divided material causes a variation in such current flow in accordance with the area and density of such patches, with movement of the inked stylus 37 on the chart 38 in like proportion, supplying a permanent record.

Figure 5:
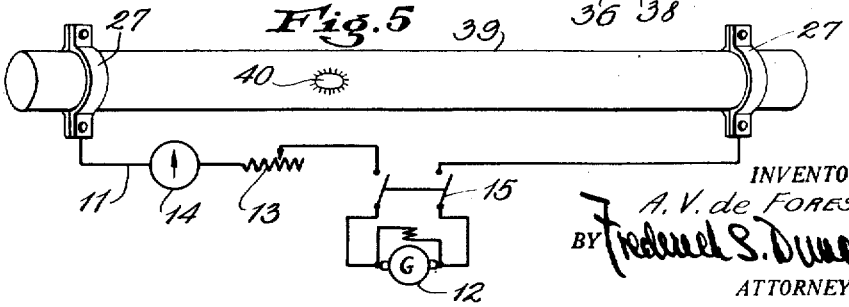
Fig. 5 is a view in side elevation of a non-magnetic bar of circular section, showing detecting material clinging to the bar in the vicinity of a flaw, under the influence of a current traversing the length of such bar.

While in Figs. 1 to 4 inclusive I have shown my invention as employed in the examination of bodies which are magnetic in character, I no not wish to limit myself to its application to such bodies alone as I have found that under some circumstances, or in the case of certain types of flaws, the method is efficient for detecting irregularities in non-magnetic bodies. In Fig. 5 I show in side elevation a body 39, such as a brass bar, which is connected to a source of electromotive force in the same way as is bar 26 in Fig. 3. As is the case of the bar 26, if finely divided magnetic material is brought into contact with the surface of the bar 39 it will form lines at right angles to the direction of electrical flow, in regions where the bar is uniform in structure, that is, has no irregularities. If, however, there exist an irregularity such, for example, as a cavity 40 near the surface, there will be a change in the direction of the current flow as well as a change in its density, in the immediate vicinity of the bounding portions of such cavity or other imperfection. By proper selection of the size and permeability of the material entering into the finely divided particles, there can be demonstrated a tendency for the particles to align themselves in a pattern significant of such change in density and direction of flow which is manifested by grouping of the particles near such cavity as shown by the radial lines about the flaw 40 in Fig. 5.

In the foregoing I have described my invention as applied more particularly to the examination of the interior surfaces of test bodies. It will be understood, however, that in the case of cylindrical or hollow bodies, such as tubes, wherein the inner surfaces are either partially or wholly exposed to view, inspection of such interior surfaces is entirely feasible, the presence and distribution of the attracted particles being possible either by direct examination or through the assistance of mirror or other optical devices. It is not to be assumed that it is essential for the reliable determination of flaws by my method that defects must necessarily be on or immediately adjacent to an exterior or interior surface of the body under inspection. With proper selection of the shape, size and quality of the subdivided material which is employed for detecting purposes, it is also possible by the method described to determine defects which are in the interior of the body.

In the application of my invention as thus described, I do not propose to limit myself to any specific form or means of magnetization, it being requisite only that the test body shall be under the influence of a magnetizing field or in a magnetized state from the effects of such a field, however, such field is or has been applied. Nor do I propose to limit myself in the application of the invention to the detection alone of such irregularities which are customarily classed as flaws. For example, the methods of test shown are valuable in examining the characteristics of welds, in detecting non-uniformity in case hardening and variations in the degree of cold-working of bodies.

While I have illustrated and described apparatus using direct current, my invention is not limited to such current as there are conditions under which alternating current may be employed to advantage.

I claim:

1. The method of detecting defects in a metallic object, which consists in subjecting the object to the action of a magnetic field, spraying upon the object finely divided paramagnetic particles individually coated with lubricating material, and noting adherence of the particles to the object.

2. The method of evaluating defects in a metallic object, which consists in subjecting the object to the action of a magnetic field, applying to the object finely divided paramagnetic particles of different degrees of fineness, and noting the size of the particles adhering to the object.

3. The method of evaluating defects in a metallic object, which consists in subjecting the object to the action of a magnetic field, applying to the object finely divided particles of differing magnetic properties, and qualitatively identifying the particles adhering to the object.

4. The method of evaluating defects in a metallic object, which consists in subjecting the object to the action of a magnetic field, applying to the object finely divided particles of differing dimensions and differing magnetic characteristics, and noting the identity and quantity of the particles adhering to the object.

5. The method of evaluating inhomogeneities in a metallic object, which consists in subjecting the object to the action of a magnetic field, applying to the object finely divided paramagnetic particles of different degrees of fineness, and noting the size of the particles adhering to the object.

6. The method of detecting defects in a metallic object which consists in subjecting the object to the action of a variable magnetic field, applying to the object finely divided paramagnetic particles individually coated with lubricating material and noting adherence of the particles to the object.

7. The method of detecting defects in a metallic object which consists in passing an alternating current through the object, applying to the object finely divided paramagnetic particles individually coated with non-magnetic material and noting adherence of the particles to the object.

8. The method of testing an article of paramagnetic material which comprises inducing an alternating magnetic flux in said article, and presenting free particles of paramagnetic material in close proximity to such magnetized article.

9. The method of testing an article of paramagnetic material which comprises inducing an alternating magnetic flux in said article, and applying finely-divided paramagnetic material to such magnetized article.

10. The method of testing an article of paramagnetic material which comprises passing an alternating current through such article to magnetize the same, and applying finely-divided paramagnetic material to said article while it is so magnetized.

11. The method of testing an article of paramagnetic material which comprises passing an alternating current through said article to magnetize the same, and distributing mobile finely-divided paramagnetic material in contiguity to such magnetized article.

12. The method of testing an article of paramagnetic material which comprises magnetizing said article, rotating the magnetized article, and applying finely-divided paramagnetic material to such magnetized rotating article.

13. The method of testing an article of paramagnetic material which comprises inducing alternating magnetic flux in such article, rotating such magnetized article, and applying finely-divided paramagnetic material in contiguity to such magnetized rotating article.

14. The method of testing a cylindrical article of paramagnetic material to determine the presence therein of defects, such as cracks, which comprises rotating such article about its longitudinal axis while the article is connected in circuit with an alternating current adapted to magnetize the same, and applying finely-divided paramagnetic material to the outer surface of such magnetized rotating article.

ALFRED V. DE FOREST.